United States Patent
Cloonan et al.

(10) Patent No.: US 9,699,102 B2
(45) Date of Patent: Jul. 4, 2017

(54) VERY HIGH SPEED CABLE MODEM FOR INCREASING BANDWIDTH

(75) Inventors: Thomas J. Cloonan, Lisle, IL (US); Tim Doiron, Aurora, IL (US); Max Robbins, Portage, IN (US); Carol Ansley, Alpharetta, GA (US); Mark Bugajski, Norcross, GA (US); Russ Enderby, Suwanee, GA (US); Bruce McClelland, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1729 days.

(21) Appl. No.: 11/200,313

(22) Filed: Aug. 9, 2005

(65) Prior Publication Data
US 2006/0039380 A1 Feb. 23, 2006

Related U.S. Application Data

(60) Provisional application No. 60/599,977, filed on Aug. 9, 2004.

(51) Int. Cl.
*H04L 12/28* (2006.01)
*H04L 12/801* (2013.01)
(Continued)

(52) U.S. Cl.
CPC .......... *H04L 47/34* (2013.01); *H04L 12/2801* (2013.01); *H04L 47/10* (2013.01);
(Continued)

(58) Field of Classification Search
CPC ..... H04L 69/14; H04L 12/2861; H04L 25/14; H04L 47/2441; H04L 49/90;
(Continued)

(56) References Cited

U.S. PATENT DOCUMENTS 4,888,684 A * 12/1989 Lilja et al. .................... 710/109
5,608,733 A 3/1997 Vallee et al.
(Continued)

OTHER PUBLICATIONS

Office Action for U.S. Appl. No. 11/337,752, mailed on Feb. 2, 2010.
(Continued)

*Primary Examiner* — Wei Zhao
*Assistant Examiner* — Lionel Preval
(74) *Attorney, Agent, or Firm* — Thomas A. Ward

(57) ABSTRACT

A system for increasing bandwidth to a communication device, comprising:
a packet scheduler; and a transmitter; the system configured to operate the packet scheduler to schedule packets of a service flow onto multiple media access control (MAC) channels forming a MAC channel group before operating the transmitter to send the scheduled packets from an origination device toward a destination device, the packet scheduler waiting a maximum group cross channel skew time for an out-of sequence packet, the maximum group cross channel skew time a maximum of multiple pair cross channel skew times, one pair cross channel skew time associated with each pair grouping of MAC channels configured to be formed from the MAC channel group; and the system configured with a setting to allow only a single channel of the multiple channels of the MAC channel group to carry DOCSIS messages, and to override the setting to share at least some of the channels of the MAC channel group among multiple cable modems while the MAC channel group forms a bonded channel.

17 Claims, 5 Drawing Sheets

(51) Int. Cl.
*H04L 12/851* (2013.01)
*H04L 12/861* (2013.01)
*H04L 29/06* (2006.01)

(52) U.S. Cl.
CPC .......... *H04L 47/2441* (2013.01); *H04L 49/90* (2013.01); *H04L 49/9094* (2013.01); *H04L 69/14* (2013.01)

(58) Field of Classification Search
CPC .............. H04L 12/2874; H04L 45/245; H04N 7/17309; H04N 21/6118; H04N 21/6168; H04N 21/236; H04N 21/2365; Y02B 60/33
USPC ....... 370/395.4, 395.41, 229, 461, 235, 392, 370/537, 389, 394, 230, 395, 401, 352, 370/468, 444, 355, 238; 717/117; 709/226, 328, 238; 725/100, 120, 111, 725/126; 707/102; 455/500, 418; 375/316; 710/109
See application file for complete search history.

(56) References Cited

U.S. PATENT DOCUMENTS

| | | | |
|---|---|---|---|
| 5,617,417 A * | 4/1997 | Sathe | H04Q 11/0478 370/394 |
| 5,719,862 A * | 2/1998 | Lee et al. | 370/355 |
| 6,002,670 A | 12/1999 | Rahman et al. | |
| 6,031,821 A * | 2/2000 | Kalkunte et al. | 370/235 |
| 6,049,528 A * | 4/2000 | Hendel et al. | 370/235 |
| 6,563,821 B1 | 5/2003 | Hong et al. | |
| 6,636,955 B1 * | 10/2003 | Kessler et al. | 711/167 |
| 6,646,991 B1 * | 11/2003 | Drottar | H04L 7/02 370/238 |
| 6,704,372 B2 * | 3/2004 | Zhang et al. | 375/316 |
| 6,804,251 B1 * | 10/2004 | Limb et al. | 370/444 |
| 6,873,630 B1 * | 3/2005 | Muller et al. | 370/356 |
| 6,928,656 B1 | 8/2005 | Addington | |
| 2002/0002636 A1 * | 1/2002 | Vange et al. | 709/328 |
| 2002/0034162 A1 * | 3/2002 | Brinkerhoff et al. | 370/229 |
| 2002/0059426 A1 * | 5/2002 | Brinkerhoff et al. | 709/226 |
| 2002/0103919 A1 | 8/2002 | Hannaway | |
| 2002/0131403 A1 * | 9/2002 | Desai et al. | 370/352 |
| 2002/0131426 A1 * | 9/2002 | Amit et al. | 370/401 |
| 2002/0132629 A1 * | 9/2002 | Desai et al. | 455/500 |
| 2002/0133618 A1 * | 9/2002 | Desai | H04L 12/2801 709/238 |
| 2003/0039211 A1 * | 2/2003 | Hvostov et al. | 370/230 |
| 2003/0046618 A1 * | 3/2003 | Collins | H04L 25/14 714/700 |
| 2003/0058885 A1 * | 3/2003 | Sorenson | H04J 4/00 370/468 |
| 2003/0083054 A1 * | 5/2003 | Francesca et al. | 455/418 |
| 2003/0204697 A1 * | 10/2003 | Kessler | G06F 13/1689 711/167 |
| 2003/0223466 A1 * | 12/2003 | Noronha et al. | 370/537 |
| 2004/0019876 A1 * | 1/2004 | Dravida et al. | 717/117 |
| 2004/0037286 A1 * | 2/2004 | Huang et al. | 370/394 |
| 2004/0062198 A1 * | 4/2004 | Pedersen et al. | 370/229 |
| 2004/0076181 A1 * | 4/2004 | Pantelias et al. | 370/468 |
| 2004/0141510 A1 * | 7/2004 | Blanc et al. | 370/401 |
| 2004/0143593 A1 * | 7/2004 | Le Maut et al. | 707/102 |
| 2004/0163129 A1 * | 8/2004 | Chapman et al. | 725/126 |
| 2004/0170176 A1 * | 9/2004 | Kadambi et al. | 370/392 |
| 2004/0172658 A1 * | 9/2004 | Rakib et al. | 725/120 |
| 2004/0181811 A1 | 9/2004 | Rakib | |
| 2004/0208181 A1 * | 10/2004 | Clayton et al. | 370/395.4 |
| 2004/0240446 A1 | 12/2004 | Compton | |
| 2004/0244043 A1 * | 12/2004 | Lind et al. | 725/111 |
| 2004/0257997 A1 * | 12/2004 | Loewen et al. | 370/235 |
| 2005/0068992 A1 | 3/2005 | Kaku et al. | |
| 2005/0091396 A1 * | 4/2005 | Nilakantan et al. | 709/232 |
| 2005/0097612 A1 | 5/2005 | Pearson et al. | |
| 2005/0114900 A1 * | 5/2005 | Ladd et al. | 725/100 |
| 2005/0265376 A1 * | 12/2005 | Chapman et al. | 370/461 |
| 2005/0265392 A1 | 12/2005 | Fox et al. | |
| 2006/0002294 A1 | 1/2006 | Chapman et al. | |
| 2006/0062200 A1 | 3/2006 | Wang et al. | |
| 2006/0130113 A1 | 6/2006 | Carlucci et al. | |

OTHER PUBLICATIONS

Office Action for U.S. Appl. No. 11/337,752, mailed on Jul. 22, 2010.
Office Action for U.S. Appl. No. 11/337,752, mailed on Dec. 3, 2008.
Office Action for U.S. Appl. No. 11/337,752, mailed on Jul. 30, 2009.
Advisory Action for U.S. Appl. No. 11/337,752, mailed on Oct. 26, 2009.
Office Action, U.S. Appl. No. 11/200,313, mailed on Jun. 23, 2011.
Office Action, U.S. Appl. No. 11/337,752, mailed on Feb. 15, 2012.
PCT International Search Report for PCT/US05/28104, dated Dec. 28, 2006.

* cited by examiner

VERY HIGH SPEED CABLE MODEM FOR INCREASING BANDWIDTH

CROSS REFERENCE TO RELATED APPLICATION

This application claims priority under 35 U.S.C. 119(e) to U.S. provisional patent application No. 60/599,977 entitled "Very high speed cable modem system," which was filed Aug. 9, 2004, and is incorporated herein by reference in its entirety.

FIELD OF THE INVENTION

This invention relates, generally, to communication networks and devices and, more particularly, to increasing the bandwidth capability of a cable modem.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

In transporting downstream multimedia content, as well as data, an upstream message, or messages, is/are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user's device via a coaxial cable. Such an arrangement is known in the art as a hybrid fiber coaxial network ("HFC"). To illustrate, FIG. 1 shows a conventional system 2 for communicating between a cable modem termination system ("CMTS") 4 at a head end and a cable modem ("CM") 6 at a user location, such as a home or office. The CMTS 4 and cable modem communicate over hybrid fiber coaxial network 8. When a user requests information, for example from Internet 10, Internet protocol ("IP") packets are received from the Internet at physical layer interface ("PHY") 12 and routing/switching functionality is provided by routing/switching processor 14. From processor 14, a DOCSIS header is added and radio frequency ("RF") processing takes place at media access control ("MAC") processor 16 before being transmitted onto HFC 8 toward cable modem 6. It will be appreciated that the MAC and radio circuitry are typically separate devices/circuits, but are combined into one block in the figure for simplicity.

At cable modem 6, the packet is received at CM MAC processor 18, which performs RF functionality as well as DOCSIS processing. IP processing takes place at routing/switching processor 20, and the packet is forwarded to Ethernet interface 22 for final transport to a customer premise equipment ("CPE") user device, such as, for example, a computer, a television or a set top box.

A shown in FIG. 1, only one downstream channel between CMTS 4 and CM 6 is used because only one MAC processor is used at each. A channel is typically a 6 MHz RF channel as known in the art. Although an HFC channel between a CMTS and a CM provides an increase in performance over using a dial-up connection, customers are demanding more and more content, thus requiring even more bandwidth than a single channel over an HFC can accommodate. Thus, there is a need in the art for a method and system for increasing bandwidth over the bandwidth that is provided by a single HFC network channel, while using as much currently available components as possible.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
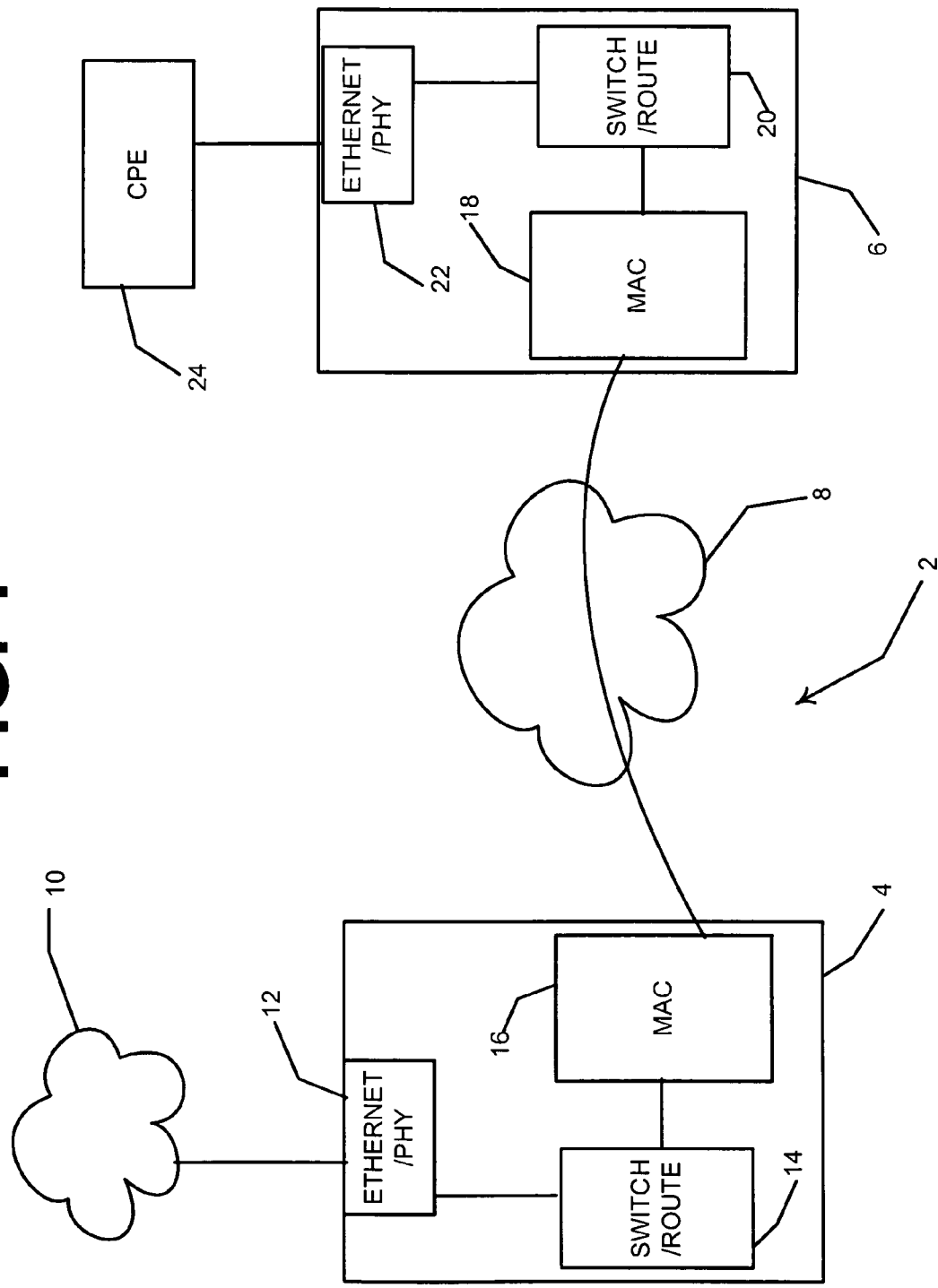
FIG. 1 illustrates a system for communicating a service flow over a single HFC channel.
Figure 2:
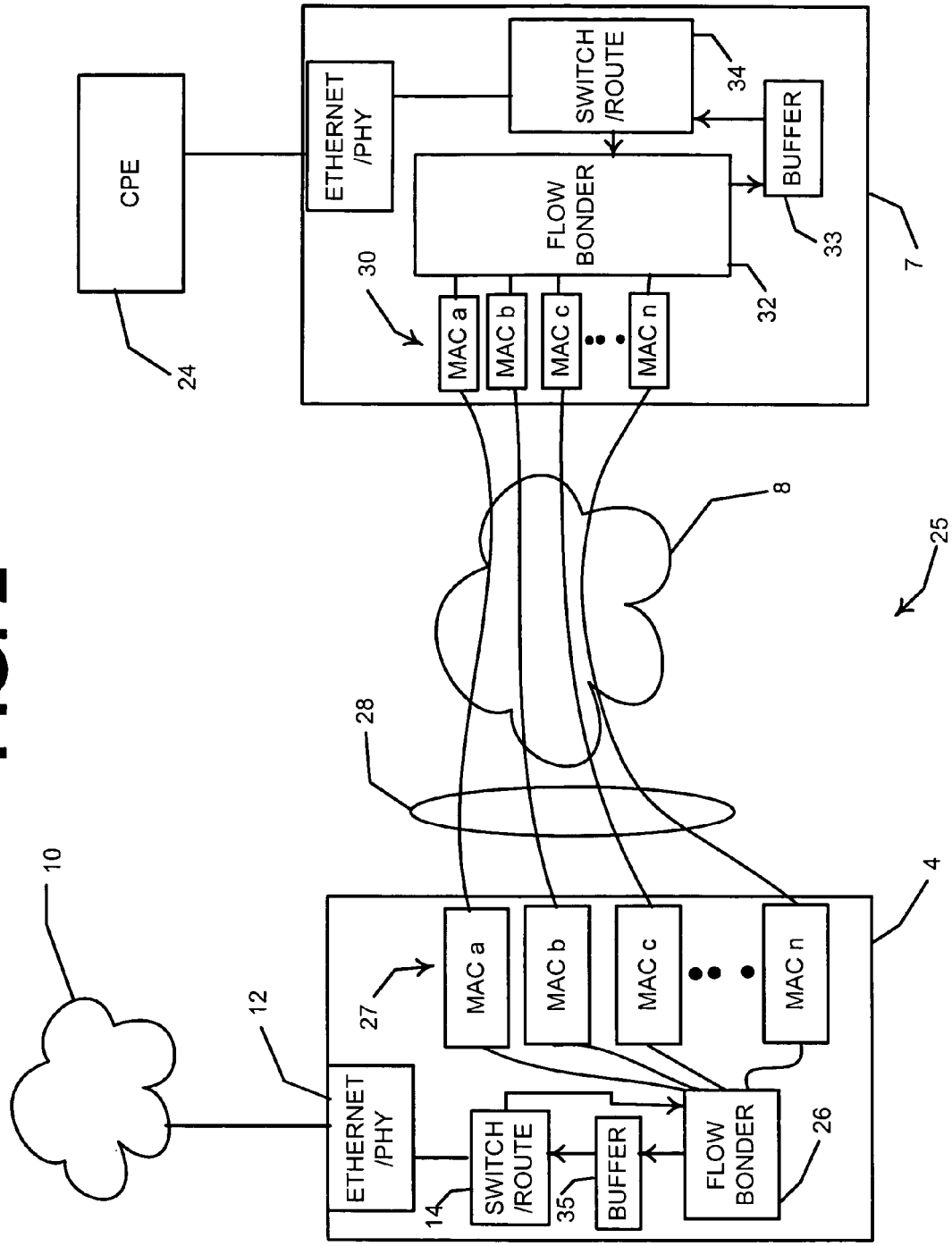
FIG. 2 illustrates a system for communicating a service flow over multiple HFC channels.

Turning to FIG. 2, a system 25 for increasing bandwidth in both the upstream and downstream directions is show. Similar to the description of FIG. 1, requested content from network 10, which may be the internet, a video server or antenna farm, or a voice network, for example, is received at PHY 12 and processed by routing/switching processor 14. However, from processor 14, packets are sent to flow bonder 26. Flow bonder 26 may be referred to as a distributor in the downstream direction and a collector in the upstream direction. Flow bonder 26 may comprise hardware, software and/or firmware.

In the downstream direction, distributor 26 determines that a given packet belongs to a particular service flow. As will be discussed in greater detail in connection with other figures, CMTS 4 and cable modem 7 determine during set up of a service flow that the service flow should use the high bandwidth capabilities as discussed herein. When CMTS 4 has determined that a particular service flow is to use the high bandwidth capabilities, a service flow identifier is associated with the service flow and is embedded into every packet that makes up the service flow. Determination that packets are part of a particular service flow may be accomplished at processor 14 based on source and destination addresses, session identifiers and/or other techniques known in the art.

The service flow identifier that is associated with and assigned to each packet that composes the service flow is placed into the packet at a standard location within the packet. Such a location my be the Ethernet header, the DOCSIS header, or other repeatable location within the packet as known in the art. After the service flow identifier has been placed into a given packet, distributor 26 also places a sequence identifier number into the packet, preferably in a location within the packet that is near the service flow identifier. The sequence identifier is assigned sequentially as packets are received from processor 14. Each sequence identifier is unique within the service flow, and the number increments for each successive packet that is received.

Distributor 26 sends packets to multiple MAC processors 27. The number of MAC processors 27 is determined based on an MSO's preference, but will typically be limited by available integrated circuits. However, if more MAC processors 27 are desired than are available in application specific integrated circuit ("ASIC"), then multiple single-channel MACs may be used, although this would typically be more complicated to design and more costly than an ASIC designed for the desired number of channels.

Packets are distributed, or scheduled, to multiple MAC processors 27 according to an algorithm based on the sequence number contained in the packet. For example, a round robin algorithm may distribute packet a packet with sequence number 1 to MAC 27a, a packet with sequence number 2 to MAC 27b, a packet with sequence number 3 to MAC 27c, and a packet having sequence number 4 to MAC 26n (with 'n' designating the total number of MACs 27). If n=4, then distributor 24 would send the next packet, having sequence number 5, to MAC 27a, and the pattern would continue. It will be appreciated that such a round robin distribution algorithm is one example of how packets may be distributed to MACs 27, and other algorithms may be used to achieve desired packet traffic load balancing, as well as other traffic engineering conditions. Thus, since the four channels 28 corresponding to the four MAC processors 27 are carrying what would otherwise be carried by a single HFC channel, the downstream bandwidth has theoretically been increased fourfold, depending on the algorithm that is used to meet desired traffic engineering conditions.

When the packets arrive at CM 7 over HFC channels 28, a number of MAC processors 30, corresponding to the number of MAC processors 27 at CMTS 4, receive the packets. Flow bonder 32 operates in the downstream direction as a collector, because it 'collects' the packets that were distributed across the multiple channels 28 and places them back into their proper order. This process may be referred to as resequencing. Accordingly, collector 32 may also be referred to as a resequencer.

Resequencer/collector 32 stores received packets to resequencing buffer 33. It will be appreciated that flow bonder 26 at CMTS 4 similarly stores packets received in the upstream direction to buffer 35. As a packet is received from one of the MAC processors 30, the identification information, including the service flow identifier and the sequence number identifier, are evaluated to determine what service flow it belongs to and its proper sequence within this associated service flow. After this information has been evaluated, the packet is placed into buffer 33 where it awaits its turn to be forwarded toward routing/switching processor device 34. If the packet stored in buffer 33 is the next packet that needs to be sent toward processor 34 according to the sequence number contained in the packet as described above (e.g., if the most recent packet sent had sequence number 13 and the packet currently stored in the buffer has sequence number 14), then it is sent.

If, however, the packet stored in buffer 33 is not the next packet that needs to be sent (e.g., the most recently sent packet has sequence number 13, but the packet currently stored in the buffer is 15), then the collector waits a predetermined amount of time $T_S$. The period $T_S$ is preferably based on a maximum skew time—as discussed in more detail below—but may be selected based on other criteria as preferred by an MSO. By waiting for predetermined period Ts so that the next packet to be sent (having sequence number 14 in the scenario given above) can be received, packets are forwarded toward CPE 24 in the order in which they were sent by distributor 26. When a packet that belongs to the same service flow as the packet that is currently stored in the buffer and that has sequence number identifier 14 is received, it is stored to a different buffer location and then sent. It will be appreciated that buffers 33 and 35 can store more than one packet. Following the sending of the packet having sequence identifier 14 in the scenario given as an example, the packet that was previously stored to the buffer having sequence identifier 14 is sent. Thus, packets are sent from buffer 33 in the order in which they were scheduled by distributor 26, even if they do not arrive at collector 32 in this same order.

The maximum skew period may be determined as follows. When this relative time measurement associated with each different combination of channel pairs, the maximum value, referred to as cross-channel skew, is determined as follows: cross-channel skew=max($|\text{transmission\_time}_i - \text{transmission\_time}_j|$), where $\text{transmission\_time}_i$ is the amount of time that it takes for a packet to travel from CMTS 4 head end to cable modem 7 over channel i, and transmission_time_j is the amount of time that it takes for a packet to travel from the CMTS to the cable modem over channel j, channels i and j being the two channels being evaluated. Thus, whatever the maximum value of the differences between channel transmission times for all the different channel pair combinations is the maximum cross channel skew value.

Assuming that there is negligible queuing latency per channel, the transmission time for a given channel can be shown to be a function of packet length and bandwidth capacity of the channel. Therefore, $\text{transmission\_time}_i = \text{packet\_length}_i / \text{bandwidth}_i$. Over time, the length of the packet to be transmitted statistically tends to be the same across each bonded channel. Thus, the cross-channel skew turns out to be a function of the relative bandwidths of the channels. Using the assumptions above, the reassembly/resequencer timer period $T_S$, as discussed above, is typically selected just large enough to account for cross-channel skew.

In selecting the value to use for Ts, the largest bandwidth that can typically be achieved in the downstream direction on an Annex B DOCSIS channel is about 42 Mbit/sec. The corresponding smallest bandwidth is about 30 Mbit/sec. Thus, assuming a maximum packet size of 1522 bytes, the timer period Ts would be set to just exceed ((1522*8)/(30 Mbit/s))−((1522*8)/(42 Mbit/s)), or approximately 116 μs.

In the upstream direction, the largest bandwidth is about 30 Mbit/s and the smallest bandwidth is about 0.32 Mbit/s. Thus, assuming a packet size of 1522, the maximum value of Timer Ts would just exceed ((1522*8)/(0.32 Mbit/s))–((1522*8)/(30 Mbit/s)), or approximately 37.7 ms. Since the modulation profile of each of the bonded channels is available at the CMTS, timer Ts may be adjusted for each CM so as to just exceed the cross-channel skew across the bonded channels. However, if queuing causes jitter across the channels, an additional component may be added to the selectable predetermined resequencer timer period $T_S$.

To facilitate flow bonding, traditional CMTS components may be controlled using modified software or firmware to operate multiple DOCSIS MACs corresponding to multiple channels for improving bandwidth. At the cable modem, a channel bonding cable modem also uses multiple DOCSIS controllers/processors, or MACs, corresponding to the multiple channels. It will be appreciated that the CMTS and the cable modem need not use the same number of MAC processors.

Each of the DOCSIS MAC controllers 30 within a channel bonding CM is referred to as a contributing cable modem ("CCM"). As discussed above, some of the elements in a channel bonding modem are illustrated in FIG. 2 that shows a channel bonding CM 7 with several CCMs 30. In a channel bonding CM, each CCM operates independently as a cable modem. Each CCM has its own MAC and IP address. Each CCM is independently manageable via SNMP. Each CCM can manage its own DOCSIS resources. Thus, a cable modem can use standard DOCSIS 1.1 or 2.0 (i.e., mass-produced and inexpensive) DOCSIS CM ASICs. Thus, currently available MAC processor ASICs may be used, but MSOs can easily transition to single ASICs that integrate multiple DOCSIS MAC processor engines as they become available.

Although each CCM 30 is basically a stand-alone cable modem, channel bonded channels from a CMTS may be configured so that only one 'master' channel of a set of channel bonded channels carry conventional DOCSIS messages. This is so that legacy DOCSIS modems that are connected to HFC 8 do not lock to the associated 'slave' channel. This facilitates full usage of the channel-bonded channels to channel bonded capable cable modems. However, as discussed later, this feature may be disable so that legacy modems can lock to these 'slave' channels from the CMTS.

It will be appreciated that a tuner is typically associated with a cable modem, and thus, each CCM will typically have separate tuner circuitry associated with it. However, if an MSO designs its channel frequency plan such that the multiple channels used in a bonded flow arrangement between the CMS and cable modem have adjacent center frequencies, then a block downconverter may be used. This allows all the adjacent channels to be downconverted to a lower intermediate frequency by a single component, thus reducing the number of components used in a corresponding ASIC. However, if an MSO wishes to maintain flexibility in assigning its channel frequencies, then each CCM will typically have a complete set of tuning circuitry associated with it.

Each CCM within an channel bonding CM indicates its bonding flow capability in its advertised modem capabilities type length value ("TLV") of the REG-REQ, as referenced in section C.1.3.1 of DOCSISRFI, as familiar to those skilled in the art. This capability is signaled to the CMTS with a bonding indicator TLV added to the modem capabilities information provided upon registration. For example, a bonding indicator TLV of 0 might indicate that flow bonding is not supported, while a TLV of 1 might indicate that flow bonding is supported. Each CCM also indicates its flow bonder's identification address TLV (type TBD) in the REG-REQ message. The field containing this TLV is preferably a 6-octet integer that uniquely identifies the flow bonder with which this particular CM instance is associated. The preferable method for assigning this value is to statically choose one of the CCM MAC addresses to be the "master" and then report that "master" MAC address as the flow bonder ID for all MAC processors associated with that particular flow bonder.

Since flow bonding will more than likely require the use of one or more limited resources in both the CM and the CMTS, the request for these resources is signaled and acknowledged before a service flow is set up. Upon receipt of a dynamic flow request with a flow bonding indicator TLV, the receiving device must verify that no other bonded service flow to the destination device's flow bonder exists with the same bonded service flow ID. Then the local flow bonder should be made aware of the request so that it may perform necessary bookkeeping.

A bonded service flow identifier value of zero is reserved for the case of a provisioned bonded flow. Upon receipt of a provisioned flow set with a bonded service flow identifier of zero, the CCM will register with the settings that are provided in the CCM's modem configuration file. In this case, the provisioned set flow parameters should be set with the maximum size of the desired bonded flow. The admitted and active set flow parameters should be set to some nominal value to allow CCM registration. As CCMs register, the flow bonder intelligently initiates attempts (via DOCSIS Dynamic Service Change messages) to increase the provisioned, admitted, and activated service flow parameters across the registered CCMs to meet the bonded flow parameters. The flow bonder assigns a non-zero bonded service flow identifier to the bonded service flow before the flow becomes active. It will be appreciated that only one flow in each direction in a CCM's cable modem configuration file may include a bonded flow indicator TLV.

The REG-REQ message for each CCM contains the flow bonding support modem capabilities TLV (enabled) as well as the flow bonder indicator TLV. If the CMTS supports flow bonding, the REG-ACK response will also contain an enabled modem capabilities TLV with flow bonding enabled. The CMTS identifies which DOCSIS CCMs are associated with a common flow-bonding CM by correlating the flow bonder identifiers. The CMTS determines how the CCMs of a given bonded-flow-capable modem are distributed across multiple DOCSIS channels to meet bandwidth demands. Thus, as mentioned above, even if a cable modem has six CCMs that can be used for bonded flow traffic, it may be desirable to provision only four CCMs for a service flow being set up based on network traffic at the time of service flow setup.

Bonded service flows may be provisioned via the cable modem configuration file by specifying two parameter sets for the flow. For example, first, the desired bonded service flow parameters are specified in the flow's provisioned set. Next, a smaller flow parameter set that will allow the CCM to register on a single DOCSIS channel is specified for the admitted and active parameter sets of the flow. Both parameter sets include the bonded service flow indicator parameter having a value of zero.

For an example illustrating setup in the upstream direction, a method by which the bonded cable modem may properly register and then establish a large bonded flow is described. Assume that a configuration file is provisioned as follows:

Provisioned Set
Upstream Maximum Sustained Traffic Rate=100 Mbps
Minimum Reserved Traffic Rate=50 Mbps
Admitted, active sets
Upstream Maximum Sustained Traffic Rate=12 kbps
Minimum Reserved Traffic Rate=4 kbps During each CCM's 30 DOCSIS registration, all TLVs from each CCM which contain bonding information are passed to flow bonder 26 at CMTS 4. Each CCM 30 registers using the channel bonding cable modem flow bonder 32 identifier address with a large (bonded) provisioned parameter set and a relatively small admitted and active parameter set for the upstream flow. Until a sufficient number of CCMs have registered for the channel bonding cable modem, the bonded flow request is not granted.

Once the CMTS flow bonder 26 has determined that enough CCMs 30 using the same channel bonding CM flow bonder 32 identifier address have registered, it will trigger a DOCSIS Dynamic Services Change ("DSC") request on each DOCSIS channel to admit, but not yet activate, a portion of the necessary bandwidth. Once enough bandwidth has been successfully admitted across all of the necessary channels to satisfy the bonded flow requirements, the CMTS' flow bonder 26 will trigger DSC requests to activate all of the admitted bandwidth. As CCMs 30 are added or deleted as bandwidth utilization on any particular channel changes, the CMTS flow bonder 26 may interact with the load balancing processes operating within CMTS 4 to modify the initial flow bonding bandwidth assignments through the use of DSC signaling to the CCMs. CMTS 4 typically establishes a large bonded downstream flow in a similar fashion.

The above-described aspects can be incorporated to function with the PacketCable Multimedia framework as known in the art. By extending the notion of a PacketCable Multimedia Gate to provide services at the bonded-flow level rather than at the DOCSIS flow level, the CMTS could be made to be responsible for allocating bandwidth across all of the DOCSIS channels (multi-channel admission control) that a subscriber's equipment has access t, based on the subscriber's equipment identifier. The per-DOCSIS flow characteristics may be automatically manipulated by the CMTS to provide the requested service.

Figure 3:
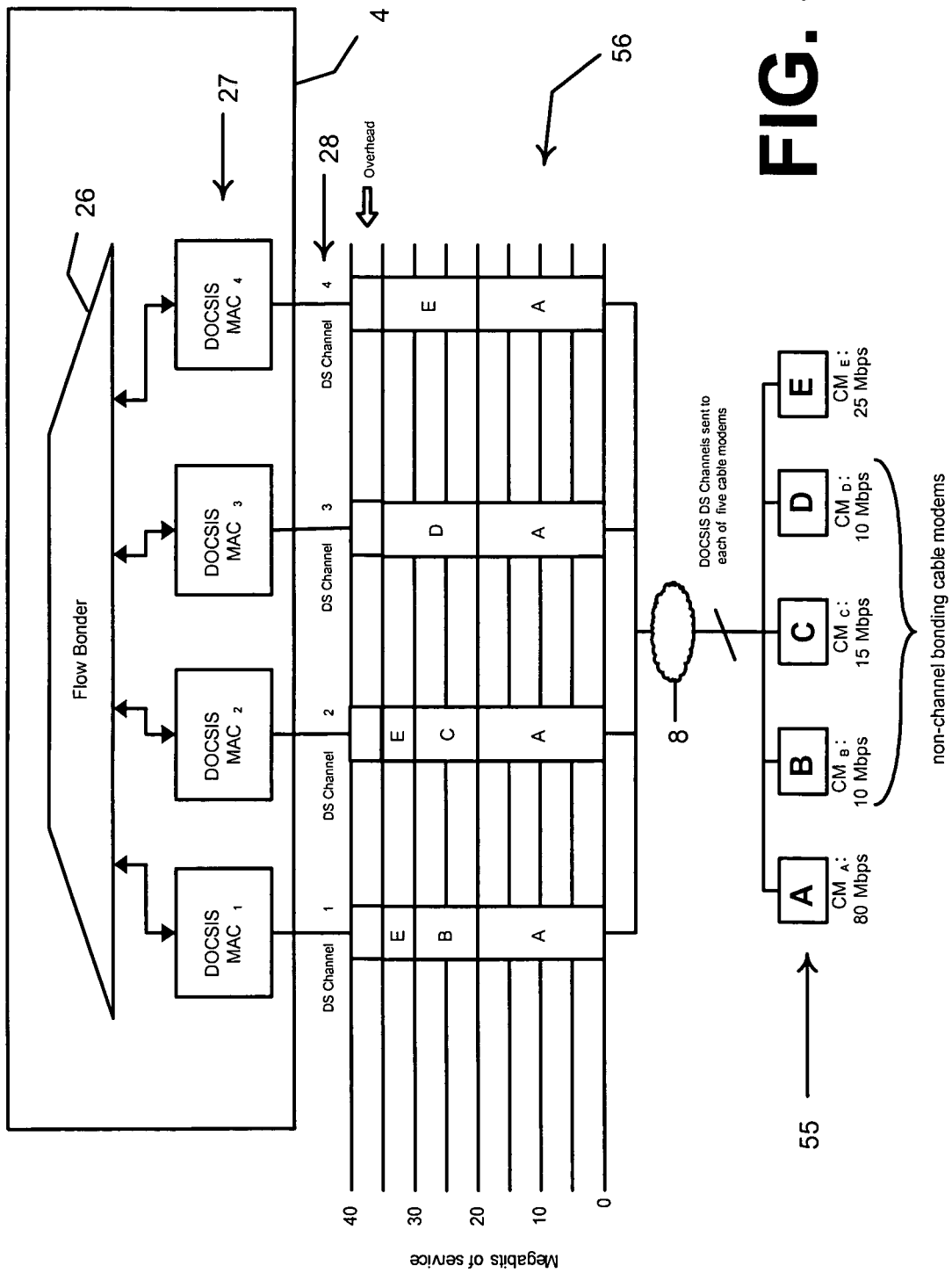
FIG. 3 illustrates a multi-channel downstream arrangement providing service to five flow-bonded modems.

An example shown in FIG. 3 illustrates an arrangement where flow bonder 26 at CMTS 4 transmits a service flow over bonded flow multiple channels 28 over HFC 8 to a group of cable modems 55. Channel distribution chart 56 shows that all four downstream channels corresponding to the four bonded MAC processors 27 at CMTS 4 are provisioned to carry information to cable modem 55A. However, only the first downstream channel carries a service flow to modem 55B and the second downstream channel carries a service flow to modem 55C. Modem 55E receives its respective service flow over the first, second and fourth channels, as shown by chart 56. Thus, it will be appreciated that depending upon the flow requirements of a particular cable modem in group 55, as transmitted in a cable modem's REG-REQ message to establish a given service flow, CMTS 4 determines which channels are to be used to deliver the flow based on the flow requirements and the current channel usage so as to facilitate balancing the load on the bonded-flow channels.

In this illustrated example, modems 55A and 55E are flow-bonding capable while modems 55B-D are legacy modems that are not flow-bonding capable. A subscriber connected to modem 55A requests a service requiring eighty megabits of service. At that particular time when the request is received at CMTS 4, the four downstream channels are underutilized; therefore an aggregate of eighty megabits of flow are granted evenly across all four downstream channels. Next, a subscriber using modem 55B requests a ten megabit service and, because modem 55B does not support flow-bonding, the request is granted using only one channel, in this case the first downstream channel. Next, a subscriber using modem 55C requests ten megabits of service and is granted using the second downstream channel. Then a subscriber using modem 55D requests and is granted fifteen megabits of bandwidth on the third downstream channel. Finally, a subscriber using cable modem 55E requests twenty-five megabit service. Now, the system does not have the capacity on all four channels to split the bonded service flow to modem 55E evenly across all four channels. Thus, it grants the request by using the remaining fifteen megabits on the fourth downstream channel and the remaining five megabits on each of the first and second downstream channels. Accordingly, channel bonding and non-channel bonding cable modems are supported by the same CMTS, and channels used for bonded flows carry traffic for non-bonded service flows as well, with the load balanced across all four of the channels.

The scheduling and collecting of packets as described above with respect to traffic flowing in the downstream direction operates in the upstream direction as well. In the upstream direction, CM 7 shown in FIG. 2 is the originating device and CMTS 4 is the destination device, as opposed to the CMTS being the originating device and the cable modem being the destination device, as is the case in the downstream traffic flow scenario described above. Thus, flow bonder 32 operates as the packet bonding distributor and flow bonder 24 acts at the bonding collector in the upstream direction. It will be appreciated that each flow bonding device is similar, or possibly even an identical device (either a discrete integrated circuit, firmware formed in a field programmable gate array, software controlled by a processor central to the origination/destination device, or a combination of some or all of the above).

Figure 4:
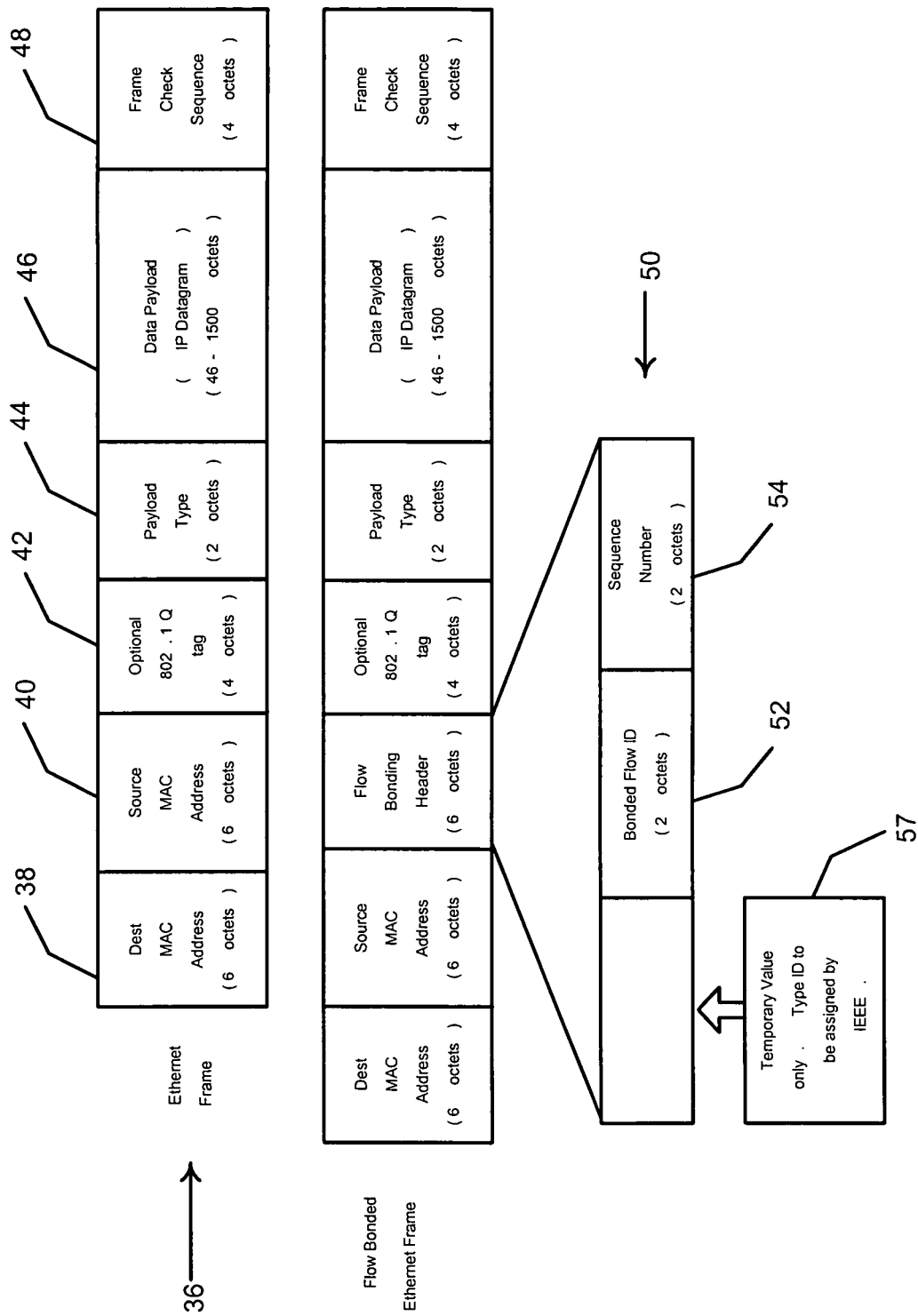
FIG. 4 illustrates an Ethernet frame arrangement having a flow-bonding header.

Turning now to FIG. 4, the location of a service flow identifier and a sequence number identifier are shown within a typical Ethernet frame. A typical Ethernet frame 36 includes a destination MAC address 38, a source MAC address 40, possibly an 802.1Q tag 42 as known in the art, a payload type identifier 44, payload 46 and a frame check sequence identifier 48. When multiple channels are bonded together, either in the upstream direction or the downstream direction, flow bonding header 50 is assigned and placed between the source MAC address 40 and the optional 802.1Q tag 42. Within flow bonding header 50 are the bonded service flow identifier 52, as described above, and the sequence number identifier 54 as described above. The service flow identifier 52 and the sequence number identifier 54 are both typically two-byte (typically octets) identifiers that are assigned during setup of the service flow and as packets are distributed at the flow bonder, respectively. In addition to the service flow identifier 52 and the sequence number identifier 54, a type identifier (TLV) 57 may be inserted before them. Type identifier 57 identifies the flow bonded packet as such to the receiving flow bonder.

Thus, a bonded service flow is identified by a series of packets flowing from the transmitting flow bonder to the receiving flow bonder with each packet containing a flow bonding header with the same bonded service flow identifier. Each bonded flow is independently managed by the transmitting flow bonder. Once a new bonded flow is created by the transmitting flow bonder, the transmitting flow bonder assigns to packets in the bonded flow a new bonded flow identifier. Preferably, newly created bonded flows begin with a bonded service flow sequence number identifier of zero in the first packet. Subsequent packets preferably have corresponding sequence number identifiers that are consecutively incremented as each sequence number identifier is assigned.

Figure 5:
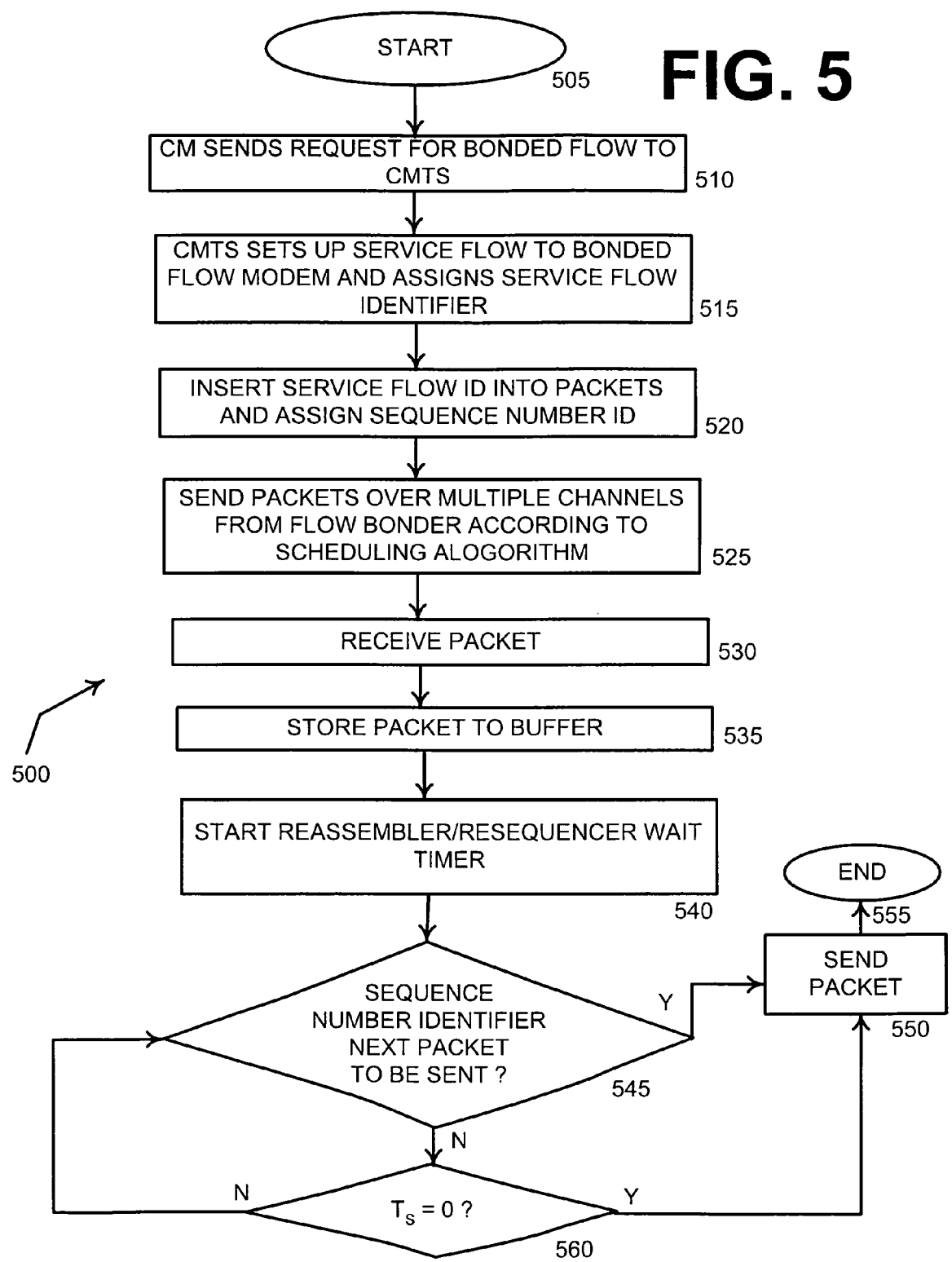
FIG. 5 illustrates a flow diagram of a method for transporting communication signals between a CMTS and a cable modem over multiple channels of an HFC.

Turning now to FIG. 5, a method 500 for transmitting a service flow over multiple channels is shown. After starting at step 505, a cable modem sends a service flow request message to the CMTS at step 510. The CMTS sets up the service flow between it and the cable modem at step 515. It will be appreciated that the service flow being set up may be a flow in the upstream direction or the downstream direction. At step 515, the CMTS determines the bandwidth requirements of the requested flow, and determines whether multiple bonded channels are needed for the flow. For example, if the requested content is a downstream transmission of a full length video movie, all available bonded flow channels between the CMTS and the cable modem may be used. If, however, the requested flow is a web page, the CMTS may only set the service flow up for single channel operation, even if multiple channels are available.

After the CMTS has set up/provisioned the service flow, packets composing (making up) the flow are identified as being part of a multi-channel bonded flow, if the flow is indeed provisioned as a multi-channel flow. To identify a multi-channel flow, a service flow identifier that is unique from all other service flows going to the destination device is assigned to the flow. This service flow identifier is inserted into the Ethernet frame header, or other portion of the packet as may be desirable, of a given pack of the flow at step 520. In addition to inserting the service flow identifier into the Ethernet frame, the CMTS also inserts a sequence number identifier in the Ethernet frame header at step 520. With respect to other packets within the service flow, the sequence number identifier corresponds to the order of the particular packet to which it is assigned.

After the service flow identifier and the sequence number identifier have been assigned/inserted into the Ethernet frame header of a packet, it is transmitted from the originating device (CMTS in the downstream direction, cable modem in the upstream direction) towards the destination device over one of the multiple bonded channels at step 525. The channel over which a given packet is transmitted is determined by the scheduling algorithm, which preferably is a round robin algorithm. However, depending upon current traffic loading and the channels which are provisioned for the particular service flow, different methods of determining the channel that will carry a packet may be used. For example, if channel one is otherwise less used than the other three in quad-bonded multi-channel arrangement, packets with sequence numbers one and two may be sent over channel one, the packet having sequence number three over a second channel, the packet having sequence number four over a third channel and the packet having sequence number five over the fourth channel. Then, the pattern would repeat. Thus, channel one would carry more of the flow's packets than the other three channels, which may be carrying other traffic and thus are otherwise more loaded than channel one.

After a packet is transmitted from the originating device according to the scheduling algorithm, it is received at the destination device at step 530. When the destination device receives the packet, the packet is stored to a resequencing buffer at step 535. Processors in the destination device keep track of the sequence numbers of packets sent out. By evaluating the sequence number of the packet retained in the buffer, the destination device can determine whether it is the next one in the sequence to be sent to the end device, such as a computer, television, set top box, etc., at the subscriber location, for example.

A wait counter is started at step 540. The wait counter operates for a predetermined period $T_S$, which is typically the programmed skew time as discussed above. If evaluation at step 545 of the sequence number of the packet stored in the resequence buffer indicates that the packet is the next one to be sent, the packet is sent from the resequencing buffer at step 550 and process 500 ends at step 555.

However, if evaluation at step 545 indicates that the packet stored in the resequence buffer is not the next packet to be sent to the user/subscriber device, a determination is made at step 560 whether the wait counter has counted down to zero. If not, process 500 returns to step 545 to determine whether the next packet to be sent has been received and stored to the buffer. If so, process 500 proceeds to step 545 and step 550 as previously discussed.

If the next packet to be sent has not been received and stored to the resequencing buffer, process 500 proceeds to step 560 and determines whether the wait counter has counted down to zero. If the wait counter has counted down to zero, process 500 proceeds to step 550 and sends the packet retained in the buffer. This is based on the assumption that the next packet to be sent must have been lost and will not be received This is because the skew time $T_S$ is based on the maximum difference in transmission times between the channels of a given pair of channels. Since the packet has not been received during the maximum time it could have taken between receipt of the currently stored packet and the next one to be sent, it is assumed the next packet to be sent was lost.

It will be appreciated that although some of the steps shown in FIG. 5 may be performed out of the order shown in the figure, starting the wait timer at step 540 rather than immediately after the receiving of the packet at step 530 may provide an additional few clock cycles to the predetermined wait counter period $T_S$. In addition, other additional time may be added to the predetermined $T_S$, to account for other factors such as, for example, queuing latency.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents. For example, multiple DSL channels could be combined in a similar fashion by combining multiple digital subscriber line access modules at a central office and multiple digital subscriber lines at a customer premise equipment device.

What is claimed is:

1. A system for increasing bandwidth to a communication device, comprising:
a packet scheduler; and a transmitter;
the system configured to operate the packet scheduler to schedule packets of a service flow onto multiple media access control (MAC) channels forming a MAC channel group before operating the transmitter to send the scheduled packets from an origination device toward a destination device, the packet scheduler waiting a maximum group cross channel skew time for an out-of sequence packet, the maximum group cross channel skew time being determined by evaluating the difference between the cross channel skew times between multiple pairs of the MAC channels; and the system configured with the setting to allow a single channel of the multiple channels of the MAC channel group to carry DOCSIS messages, and to override the setting to share at least some of the channels of the MAC channel group among multiple cable modems while the MAC channel group forms a bonded channel;

wherein the packet scheduler includes a channel bonding distributor configured to:

identify each packet as belonging to a particular service flow; assign a service flow identifier to each packet to identify the packet as belonging to its associated service flow;

assign a sequence number to each packet of the particular service flow; assign each of the packets associated with the particular service flow to one of the multiple channels according to a scheduling algorithm; and provide each packet to one of a plurality of MAC processors, said one MAC processor corresponding to the channel to which said packet has been assigned.

2. The system of claim 1 including a channel bonding collector configured to:

receive packets from a plurality of MAC processors, the number of MAC processors corresponding to a number of multiple channels over which packets of the service flow are sent from the origination device;

determine a service flow with which a given packet is associated based on a service flow identifier;

store packets associated with the determined service flow to a resequencing buffer; and transmit packets from the resequencing buffer toward a subscriber device according to a resequencing algorithm.

3. The system of claim 2 wherein the channel bonding collector transmitting a packet from the re sequencing buffer if it is a next packet that needs to be transmitted for the determined service flow.

4. The system of claim 2 the channel bonding collector further:

determining whether a packet in the resequencing buffer is the next packet that needs to be transmitted in the determined service flow;

retaining the packet in the resequencing buffer for a predetermined wait period until the next packet that needs to be transmitted in the determined service flow has been received; and transmitting the packet retained in the resequencing buffer if the next packet that needs to be transmitted in the determined service flow is not received by the channel bonding collector during the predetermined wait period.

5. The system of claim 1 wherein the originating device is a cable modem termination system.

6. The system of claim 1 wherein packets are identified as belonging to a particular service flow based on classifiers that include layer 2, layer 3 and layer 4 packet classifiers.

7. The system of claim 2 wherein the destination device is a local area network.

8. The system of claim 2 wherein the destination device is a cable modem with multiple contributing cable modems.

9. The system of claim 2 wherein the destination device is a digital television.

10. The system of claim 1 wherein the packet scheduler assigns packets to the multiple channels in a round robin fashion.

11. A method for increasing bandwidth to a communication device, comprising:

scheduling packets that compose an associated service flow onto multiple MAC channels forming a MAC channel group before sending the scheduled packets from an origination device toward a destination device;

waiting a maximum group cross channel skew time for an out-of sequence packet, the maximum group cross channel skew time being determined by evaluating the difference between the cross channel skew times between multiple pairs of the MAC channels;

setting only a single channel of the multiple channels of the MAC channel group to carry DOCSIS messages;

overriding the setting to share at least some of the channels of the MAC channel group among multiple cable modems while the MAC channel group forms a bonded channel;

identifying each packet as belonging to a particular service flow based on packet classifiers;

assigning a service flow identifier to each packet to identify the packet as belonging to its associated service flow;

assigning a sequence number to each packet of the particular service flow;

assigning each of the packets associated with a particular service flow to one of the multiple channels according to a scheduling algorithm; and providing each packet to one of a plurality of MAC processors, said MAC processor to which a packet is provided corresponding to the channel to which said packet has been assigned.

12. The method of claim 11 including:

receiving packets from a plurality of MAC processors, the number of MAC processors corresponding to the number of multiple channels over which the packets of the service flow are sent from the origination device;

determining a service flow with which a given packet is associated based on a service flow identifier;

storing packets associated with the determined service flow to a resequencing buffer; and transmitting packets from the resequencing buffer toward a subscriber device according to a resequencing algorithm.

13. The method of claim 12 wherein the resequencing algorithm includes transmitting a packet from the resequencing buffer if it is the next packet that needs to be transmitted for the determined service flow.

14. The method of claim 12 wherein the resequencing algorithm includes:

determining whether a packet in the resequencing buffer is the next packet that needs to be transmitted in the determined service flow;

retaining the packet in the resequencing buffer for a predetermined wait period until the next packet that needs to be transmitted in the determined service flow has been received; and transmitting the packet retained in the resequencing buffer if the next packet that needs to be transmitted in the determined service flow is not received by the channel bonding collector during the predetermined wait period.

15. The method of claim 11 wherein the originating and destination devices are a cable modem termination system and a cable modem, respectively, in the downstream direction, and the origination and destination devices are a cable modem and a cable modem termination system, respectively, in the upstream direction.

16. The method of claim 11 wherein the classifiers include layer 2, layer 3 and layer 4 packet classifiers.

17. The method of claim 11 wherein the scheduling algorithm assigns packets to the multiple channels in a round robin fashion.

\* \* \* \* \*